(12) United States Patent
Grote et al.

(10) Patent No.: US 6,450,588 B2
(45) Date of Patent: **\*Sep. 17, 2002**

(54) VEHICULAR BRAKE-BY-WIRE SYSTEM

(75) Inventors: John F. Grote, Columbus, IN (US); J. Denton Tarbot, Santa Clarita, CA (US)

(73) Assignee: Control System Technology, Inc., Columbus, IN (US)

(\*) Notice: Subject to any disclaimer, the term of this patent is extended or adjusted under 35 U.S.C. 154(b) by 0 days.

This patent is subject to a terminal disclaimer.

(21) Appl. No.: 09/898,629

(22) Filed: Jul. 3, 2001

Related U.S. Application Data (63) Continuation of application No. 09/332,299, filed on Jun. 11, 1999, now Pat. No. 6,293,632.

(51) Int. Cl.⁷ ................................................. B60T 7/20
(52) U.S. Cl. ............. 303/112; 303/122.08; 188/1.11 E; 188/72.1
(58) Field of Search ........................... 303/112, 122.08, 303/3; 188/158, 156, 370, 1.11 R, 1.11 E, 72.1, 71.8

(56) References Cited

U.S. PATENT DOCUMENTS

| | | | |
|---|---|---|---|
| 4,309,060 A | 1/1982 | Lieber et al. | 303/106 |
| 4,629,039 A | 12/1986 | Imoto et al. | 188/72.1 |
| 4,705,323 A | 11/1987 | Imoto et al. | 303/116 |
| 4,854,424 A | 8/1989 | Yamatoh et al. | 188/72.1 |
| 5,000,521 A | 3/1991 | Majima et al. | 303/92 |
| 5,029,947 A | 7/1991 | Knight et al. | 303/7 |
| 5,067,778 A | 11/1991 | Testardi | 303/113 |
| 5,090,518 A | 2/1992 | Schenk et al. | 188/72.1 |
| 5,125,483 A | 6/1992 | Kitagawa et al. | 188/158 |
| 5,147,116 A | 9/1992 | Parker et al. | 303/115 |
| 5,219,214 A | 6/1993 | Savage et al. | 303/115.2 |
| 5,249,848 A | 10/1993 | Matsuto et al. | 303/100 |
| 5,261,732 A | 11/1993 | Matouka | 303/115.2 |
| 5,267,589 A | 12/1993 | Watanabe | 137/625.65 |
| 5,279,394 A | 1/1994 | Wollenweber et al. | 188/1.11 |
| 5,308,154 A | 5/1994 | Matouka | 303/115.2 |
| 5,312,172 A | 5/1994 | Tekeuchi | 303/113.1 |
| 5,320,421 A | 6/1994 | Kade et al. | 303/100 |
| 5,333,940 A | 8/1994 | Topfer | 303/7 |
| 5,333,944 A | 8/1994 | Shirai et al. | 303/105 |
| 5,445,185 A | 8/1995 | Watanabe et al. | 137/596.17 |
| 5,468,058 A | 11/1995 | Linkner, Jr. | 303/115.2 |
| 5,477,943 A | 12/1995 | Enomoto et al. | 188/1.11 |
| 5,560,690 A | 10/1996 | Hattori et al. | 303/116.2 |
| 5,566,703 A | 10/1996 | Watanabe et al. | 137/1 |
| 5,588,720 A | 12/1996 | Mattern | 303/122.08 |
| 5,597,214 A | 1/1997 | Katagiri et al. | 303/10 |
| 5,605,387 A | 2/1997 | Cook et al. | 303/132 |
| 5,611,606 A | 3/1997 | Nell et al. | 303/155 |
| 5,615,931 A | 4/1997 | Stumpe et al. | 303/22.1 |
| 5,632,530 A | 5/1997 | Brearley | 303/22.1 |
| 5,632,841 A | 5/1997 | Hellbaum et al. | 156/245 |
| 5,645,143 A | 7/1997 | Mohr et al. | 188/72.1 |
| 5,657,229 A | 8/1997 | Naito et al. | 364/26.015 |
| 5,700,072 A | 12/1997 | Cook et al. | 303/135 |
| 5,707,115 A | 1/1998 | Bodie et al. | 303/3 |
| 5,713,643 A | 2/1998 | Esselbrugge et al. | 303/122.08 |
| 5,941,612 A | 8/1999 | Carpenter | 303/122 |
| 6,112,842 A | 9/2000 | Ura et al. | 180/233 |
| 6,293,632 B1 \* | 9/2001 | Grote et al. | 303/112 |

FOREIGN PATENT DOCUMENTS

| | | | |
|---|---|---|---|
| DE | 39 22 504 | 6/1990 | H01K/41/08 |
| JP | 1-212485 | of 1989 | H01L/41/04 |

\* cited by examiner

*Primary Examiner*—Cristopher P. Schwartz
*Assistant Examiner*—Mariano Sy
(74) *Attorney, Agent, or Firm*—Woodard, Emhardt, Naughton Moriarty & McNett

(57) ABSTRACT

The present invention provides an improved torque actuator control system using data inputs from an operator controlled input transducer relating to the desired torque output of a controlled member and inputs concerning the directly measured speed and torque of the controlled member. The improved torque actuator control circuit uses the inputs to generate an output command to the controlled member that results in the direct application of the desired torque output from the controlled member.

20 Claims, 9 Drawing Sheets

VEHICULAR BRAKE-BY-WIRE SYSTEM

CROSS-REFERENCE TO RELATED APPLICATIONS

This application is a continuation of U.S. patent application Ser. No. 09/332,299 filed Jun. 11, 1999, which is now U.S. Pat. No. 6,293,632 B1 and claims priority thereto.

TECHNICAL FIELD OF THE INVENTION

The present invention relates generally to methods and systems for providing variable pressure responsive to sensed conditions using piezoelectric materials and more specifically to an vehicular electronic braking system that includes a piezoelectric effect braking device for each individually controlled wheel.

BACKGROUND OF THE INVENTION

Hydraulic vehicular braking systems are well known to engineers of ordinary skill in the art and are incorporated in virtually all of the vehicles currently in service. The two most common types of brake systems now in use in cars are hydraulic drum brakes and hydraulic disc brakes. A hydraulic brake system operates by using pressurized fluid from a master cylinder to force a friction member against a rotating rotor or drum. The rotor or drum rotates with a wheel, while the friction member is non-rotating. A disc brake system incorporates a non-rotating brake pad capable of being hydraulically forced against the rotating rotor or rotating drum to apply brake torque to the wheel. Both drum and disc brake systems use a master hydraulic cylinder to translate a signal from the operator into a braking signal to the wheel hydraulic brake cylinders that push the friction members against the rotors to brake the wheels. The wheel hydraulic cylinders and corresponding friction members are positioned at each of the wheels to be braked.

When the operator desires to slow or stop a car with a hydraulic brake system, he engages a control actuator. The control actuator is commonly a foot pedal in fluid communication with the master cylinder. Depression of the foot pedal pressurizes the master cylinder. Pressurization of the master cylinder results in pressurized fluid being sent to the individual brake cylinders connected to each wheel. Pressurization of an individual brake cylinder forces a brake-operating member (such as piston coupled to a brake pad) against a portion of the wheel assembly. Intermediary pumps help to maintain and amplify the hydraulic pressure to brake cylinders, so that sufficient force is applied to the brake discs or brake drums to slow or stop the car.

The frictional force provided by the brake to slow the wheel is affected by the frictional forces acting between the wheel and the road. When the friction between a given wheel and the road is relatively small, for example when the road is slick, the brake friction will have a relatively great effect on that wheel. In that event, the applied braking force may excessively slow or even stop its rotation relative to the other wheels (in contact with a relatively normal road surface). This can result in a skid event and a corresponding loss of vehicle control. Anti-lock brake systems have been developed that automatically incrementally reduce brake cylinder pressure. These systems indirectly measure the resultant torque on the wheel from the forward momentum of the vehicle and the applied braking friction and, if too great, reduce braking pressure until the braking torque drops below a predetermined threshold point corresponding to the resumption of regular wheel rotation. Pressure is then allowed to rebuild. If the torque again reaches the critical point, pressure is again relieved.

Recently an electrically controlled brake system has been proposed wherein the required operating force or stroke of the brake-operating member is electrically determined. The amount of brake force applied to the wheel would be controlled so as to provide a braking effect that corresponds to the required amount of brake force determined by the operating member. Examples of such an electrically controlled brake system are disclosed in U.S. Pat. No. 5,333,944 to Shirai. That reference discloses a system wherein the hydraulic pressure in the wheel brake cylinder is electrically controlled to provide a suitable deceleration value of the vehicle.

In the Shirai system, the deceleration value is governed by the electrically detected operating force determined by the brake-operating member. The hydraulic pressure in an accumulator is controlled by a solenoid-operated pressure control valve, and the controlled hydraulic pressure is applied to the wheel brake cylinder, to force a brake pad against the rotor or drum so that the wheel rotating with the rotor or drum is braked. The solenoid coil current is determined by the controller so that the hydraulic pressure applied to the wheel cylinder is such that the detected actual deceleration value of the vehicle matches the target or desired deceleration value determined based on the electrically detected operating force determined by the brake operating member. The amount of pressure applied to the friction member is controlled such that the detected amount of output force coincides with the target reaction force determined by the brake-operating member.

Prior systems, such as the Shirai system, have relied on pressurized hydraulic fluid flowing from a central source, such as a master cylinder or accumulator, through valves into an individual wheel cylinder to exert pressure on a friction member such as a brake pad against the rotor or wheel drum to brake the vehicle. Such systems suffer from a number of disadvantages. One disadvantage is the requirement of the vehicle's motor to be running in order to maintain a sufficient available hydraulic pressure. Another disadvantage is that the braking of all wheels relies on the central fluid source. Damage to the central fluid source causing depressurization or obstructing the flow of the hydraulic fluid can disable braking of all four wheels. Still another disadvantage is the extra weight and volume requirements of the master cylinder. Yet another disadvantage is the expense of the hydraulic components and fixing or replacing them. Prior systems have also required the controlled opening and closing of a hydraulic valve to apply and remove the braking torque from the wheels. Moreover, there is a finite lag in the response time between the operator's actuation of the brake controls and the application of the full braking torque to the wheels arising from the finite time required for the solenoid to open the valves and the fluid to achieve full pressure against the friction member.

Consequently, there is a need for a faster, less expensive, lighter, and more efficient vehicular braking system that among other things does not require the motor to be running in order to actuate the braking system and wherein braking is not contingent upon the integrity of a single fluid source. The present invention meets this need.

SUMMARY OF THE INVENTION

One form of the present invention contemplates a control system wherein a controller is adapted to receive operator commands, speed or motion data and output torque or force feedback data from the controlled system and to use these inputs to calculate how much torque to apply to the controlled system to best meet the operator commands. The controller is adapted to control a plurality of different individual subsystems comprising the overall controlled system.

One object of the present invention is to provide an improved vehicular braking system. Related objects and advantages will become apparent from the following description.

DETAILED DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein, being contemplated as would normally occur to one skilled in the art to which the invention relates.

The present invention relates to methods and systems for providing variable pressure and/or torque outputs responsive to operator inputs and independently sensed conditions. One form of the present invention includes a controller for governing the output of an actuator member, such as a torque generator, a vibration inducer, or the like. The controller includes a microprocessor adapted to receive multiple input signals, such as sensor data signals and/or control signals. The microprocessor is further adapted to send at least one output signal. The output signal is generated in response to the input signals. The microprocessor is adapted to use the input signal data to calculate the appropriate output signal to send to a known actuator member to induce the actuator member to perform a desired function. The control signals sent to the microprocessor may be simple on/off signals, or may relate to more precisely controlled output of the actuator member. Applications of the present invention include vehicular brake systems, vehicular power steering systems, vibrational damping systems, other pressure-oriented systems, and the like.

Figure 1:
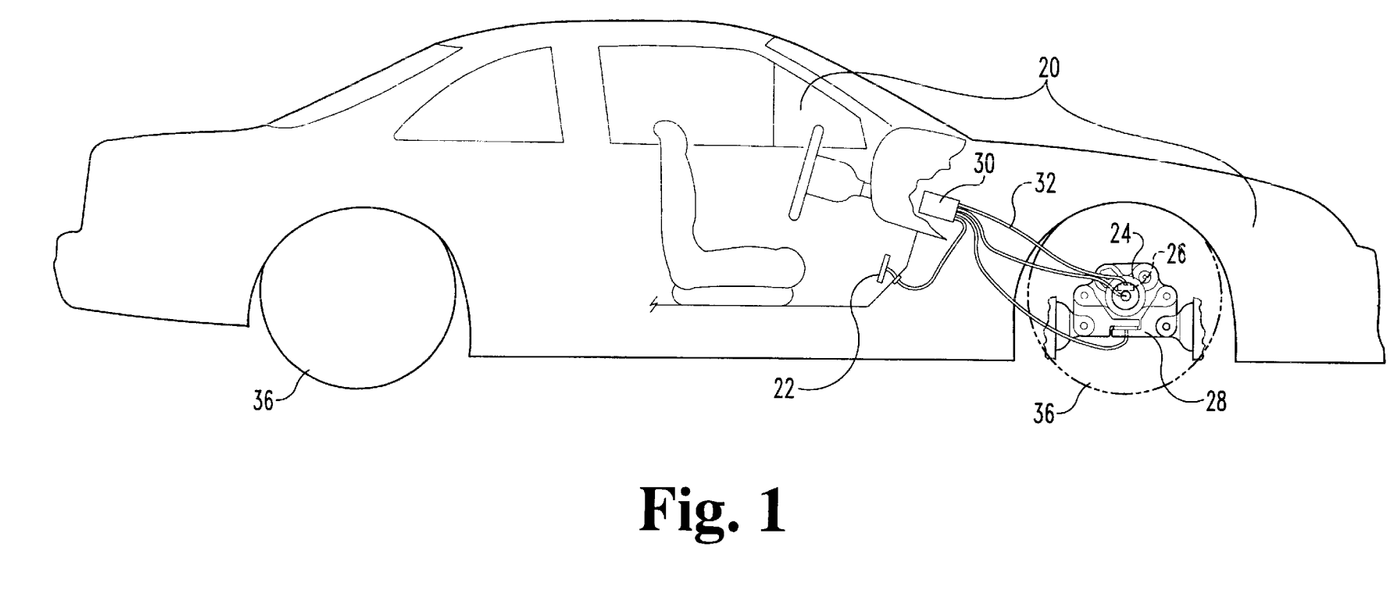
FIG. 1 is a schematic view of a first embodiment of the present invention.

FIGS. 1–5 generally illustrate a preferred embodiment of the present invention, a vehicular brake system 20 having an operator command input transducer (OCIT) 22, a torque actuator 24, a wheel speed sensor 26, a torque feedback transducer 28, and a controller 30, for use with vehicles such as automobiles, busses, aircraft, and the like. As shown in FIG. 1, the controller 30 is connected to the sensors and/or transducers 26, 28 and/or actuators 24 by conduits 32, such as electric wire and/or fiber-optic cable, and controls the independent braking of all of rotating vehicle members 33 for which braking is desired, such as the wheels of an automobile, without the requirement of a master cylinder or other central fluid receptacle.

Figure 2:
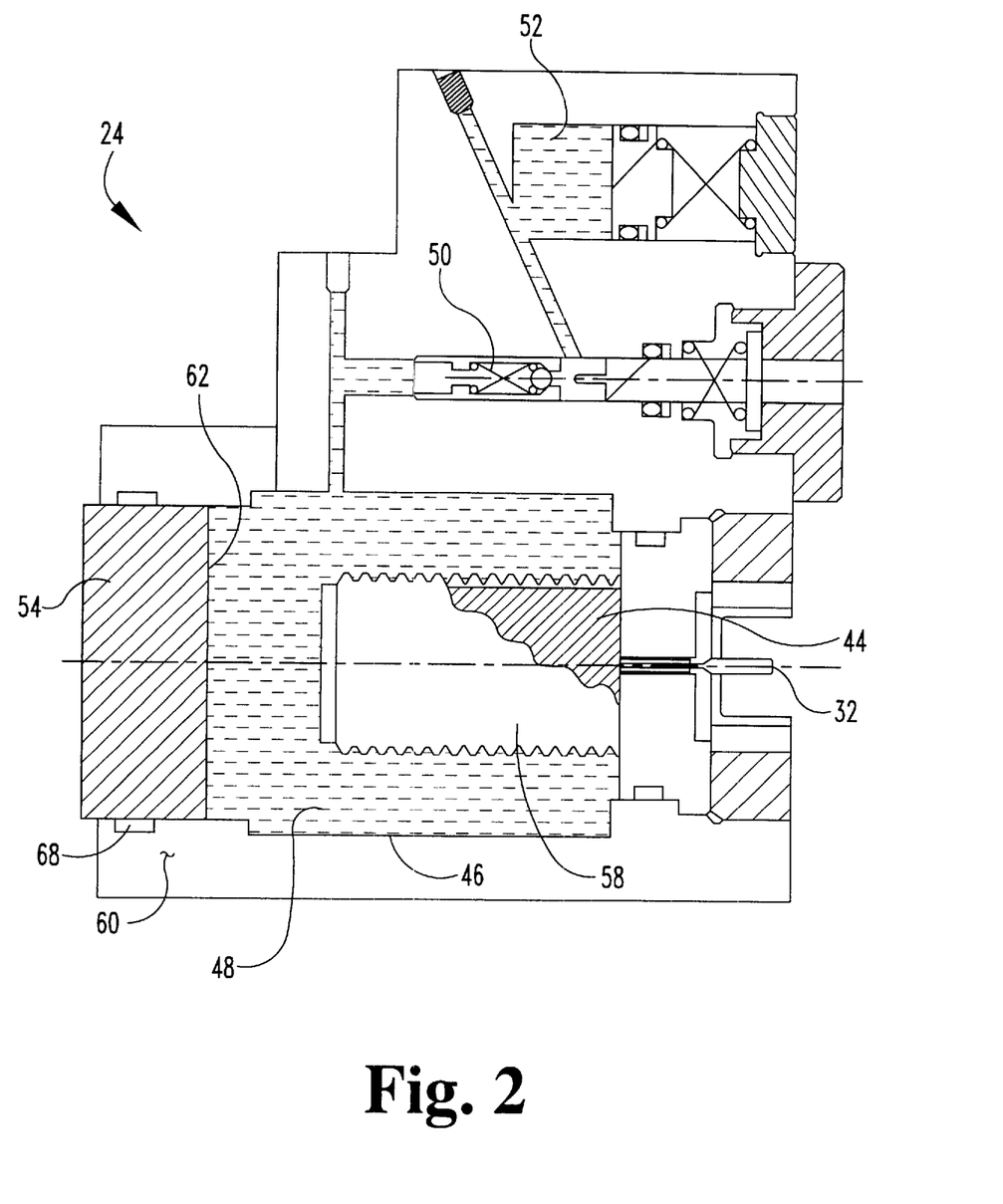
FIG. 2 is a first schematic view of the torque actuator of FIG. 1.

FIG. 2 illustrates torque actuator assembly 24. Torque actuator assembly 24 applies a braking torque on a rotatable brake member 34, for example, a vehicle wheel rotor (FIG. 4) or other part connected to or a portion of wheel 36, by forcing brake pads 38 into frictional contact with rotatable brake member 34. The input command to torque actuator assembly 24 is an electrical or fiber optic signal from microprocessor 42 of controller 30. The output is a torque applied to rotatable brake member 34, and consequently to a wheel 36, by developing a load onto a brake pad 38, which engages rotatable brake member 34.

In one form, the torque actuator assembly 24 includes a piezoelectric element 44 situated inside a primary fluid chamber 46, such as a hydraulic cylinder. The remaining volume defined by chamber 46 is filled with hydraulic fluid 48. Piezoelectric element 44 is operationally coupled to controller 30 via conduit 32. Primary fluid chamber 46 is in fluid communication with a unidirectional valve 50 adapted to allow fluid into chamber 46 from a reservoir 52. Primary fluid chamber 46 also includes a piston 54 mounted therein. Piston 54 is situated partially within and partially without the chamber. When an activating voltage is applied to piezoelectric element 44, it controllably expands, increasing pressure on fluid 48 and forcing piston 54 to extend from chamber 46. Piston 54 transmits this force through a set of brake elements 56 onto rotating brake member 34 and thus to wheel 36.

The applied braking load is developed entirely by piezoelectric element 44. Preferably, piezoelectric element 44 is a flexible laminate of pre-stressed polymeric materials and piezoelectric ceramics. For example, and not by limitation, the thin layer composite unimorph piezoelectric driver and sensor (THUNDER) device developed by NASA and disclosed in U.S. Pat. No. 5,632,841, the disclosure of which is incorporated herein by reference, is one embodiment of piezoelectric element 44. The THUNDER piezoelectric composite shows a displacement about 50 times greater than device thickness and several orders of magnitude increase over known piezoelectric devices, with a wide operating frequency range and having displacement loads exceeding 10 Kg. Alternatively, in other forms where such extreme piezoelectric properties are not required, any convenient monolithic, stacked or composite ceramic or polymeric or combination piezoelectric material may be used as piezoelectric element 44.

Piezoelectric element 44 may be enclosed in an expandable and contractible layer 58 (such as an elastic coating or an accordion bag) and may be positioned within primary fluid chamber 46 whereby element 44 may indirectly transmit the braking load by changing volume within primary fluid filled chamber 46, thereby extending piston 54 and brake pad 38 into contact with wheel rotor 34. Alternately, piezoelectric element 44 may transmit the braking load directly by pushing directly against brake pad 38.

Primary fluid chamber 46 has a fixed volume within which is partially situated a moveable piston 54. Piston 54 passes through chamber wall 60. A first end 62 of moveable piston 54 is immersed in hydraulic fluid 48 contained in the primary fluid chamber 46. A second end 64 of piston 54 contacts a non-rotatable brake element 66 (such as a shoe) having a friction pad 38 (see FIG. 4). Piston shaft 54 passes through wall 60 of primary fluid chamber 46 having a shaft seal 68 around moveable piston 54 adapted to seal fluid 48 within primary fluid chamber 46.

As the volume of piezoelectric element 44 increases, moveable piston 54 is displaced relative to the chamber wall. Moveable piston 54 will apply a developed braking torque by increasing the friction force between brake pad 38 and a rotatable brake element 34, such as a wheel rotor, disc, or drum (see FIG. 4).

Preferably, torque actuator assembly 24 also incorporates a fluid replenishing system. The fluid replenishing system includes a reservoir 52 and a unidirectional valve 50, such as a check valve, adapted to pass hydraulic fluid 48 from reservoir 52 to primary fluid chamber 46. This system operates to add hydraulic fluid 48 to primary fluid chamber 46 as brake pads 38 wear during normal operation. When the braking command is decreased and the hydraulic pressure in primary fluid chamber 46 decreases below a predetermined minimum pressure level, replenishing reservoir 52 delivers fluid to the primary fluid chamber as required. Replenishing reservoir 52 is pressurized to a level just below minimum brake pressure level. Unidirectional valve 50 is biased such that when pressure in chamber 46 is below the pressure in replenishing reservoir 52, valve 50 opens to allow fluid to flow from reservoir 52 into chamber 46. Thus, when the level of fluid 48 is low, the fluid pressure is correspondingly low and pressure in reservoir 52 forces fluid 48 through valve 50 into chamber 46. The volume of hydraulic fluid 48 delivered to primary fluid chamber 46 from replenishing reservoir 52 is substantially equal to the volume of brake pad 38 worn off.

Torque actuator assembly 24 also incorporates braking torque feedback from each controlled wheel 36 to controller 30 (see FIG. 1). Brake system 20 (see FIG. 1) detects the developed brake torque on the controlled wheel 36. The developed brake torque is defined here as the effect of the commanded brake torque via piezoelectric element 44 on the given wheel under the frictional parameters between the wheel tire and the driving surface. For a given braking command the developed braking torque is greater when the effective friction coefficient at the interface between the tire and the road is high and is less when the effective friction coefficient at the road interface is low.

Figure 3:
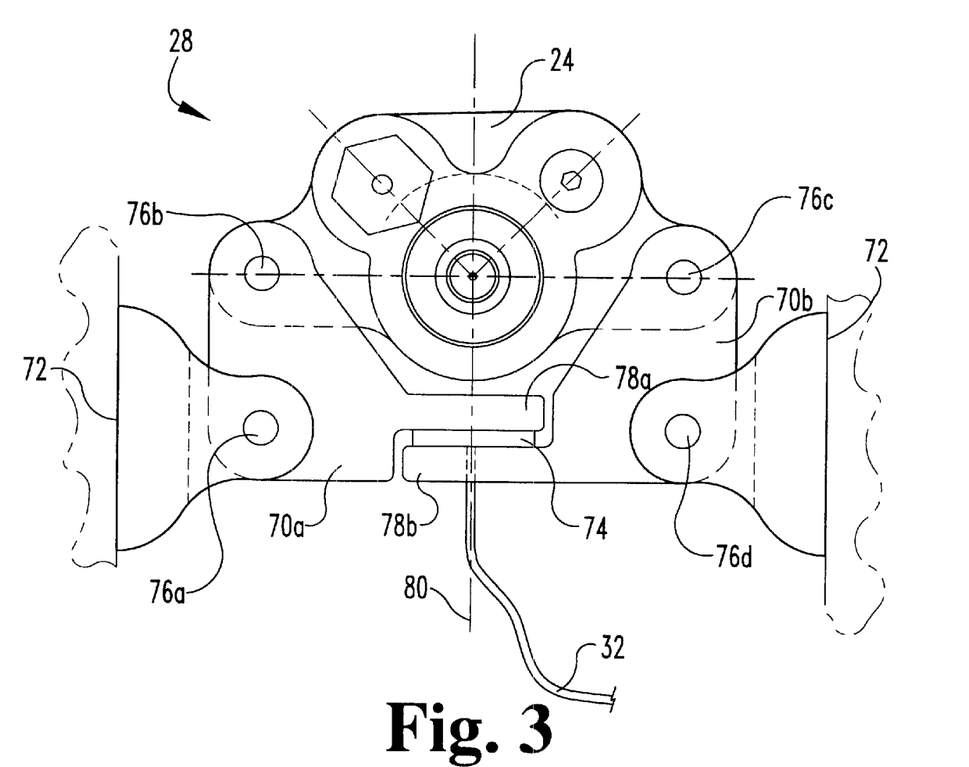
FIG. 3 is a schematic view of the torque feedback transducer of FIG. 1.

FIG. 3 illustrates torque feedback transducer assembly 28. Torque feedback transducer assembly 28 provides a signal representing the braking torque developed on a given wheel 36 to controller unit 30. In one form, torque feedback transducer 28 includes a pair of rotatable overlapping torsion arms 70a, 70b fastened to a vehicle frame 72 on opposite sides of torque actuator assembly 24. Each torsion arm 70a, 70b is operationally coupled to both vehicle frame 72 and torque feedback transducer 28. Torsion arm 70a is rotatable about pivot points 76a and 76b and torsion arm 70b is rotatable about pivot points 76c and 76d. In one specific embodiment, torsion arms 70a, 70b pivot or rotate in a plane substantially perpendicular to the axis of rotation of wheel 36. Torsion arms 70a, 70b each include respective overlapping portions 78a and 78b. Torsion arms 70a, 70b are positioned such that their overlapping elongated portions 78a, 78b are substantially centered in the vertical plane 80 which includes the major axis of rotation (not shown) of wheel 36. Wheel 36 generally rotates between frame parts 72. Transducer element 74 is positioned between overlapping portions 78a, 78b and is operationally connected to controller 30 via conduit 32. Transducer element 74 may comprise any conveniently sensitive and reliable piezoelectric material, and is positioned such that the braking torque acts on the piezoelectric element 74 as a mechanical squeezing force, as described below in further detail, to produce an electrical or fiber optic output signal to be sent to controller 30. Further, torque feedback transducer assembly 28 has a sufficiently fast response time to allow the controller 30 to maximize the braking control efficiency of brake system 20.

Figure 4:
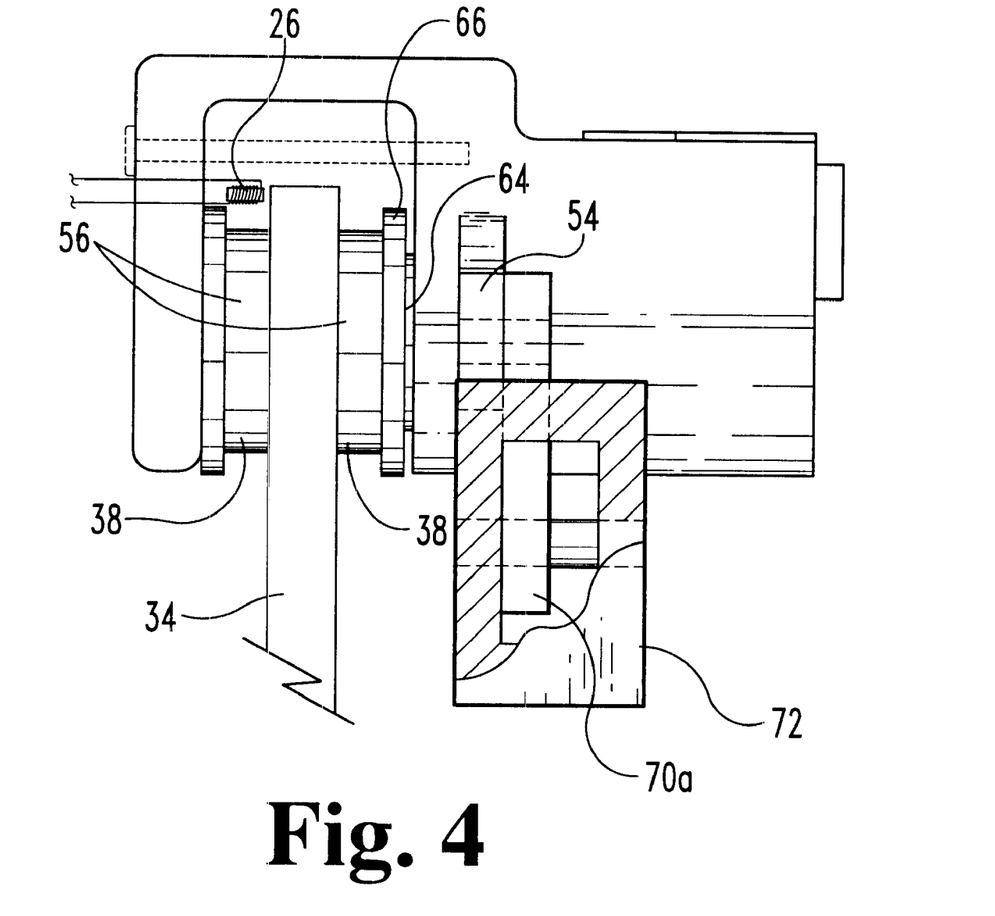
FIG. 4 is a schematic view of a brake system for use with the embodiment of the invention illustrated in FIG. 1.

Referring to FIGS. 1 and 4, torque feedback transducer assembly 28 is situated inboard of wheel 36, which in forward motion turns clockwise from the viewpoint of FIGS. 1 and 3. When a braking torque (i.e. a torque in a counterclockwise is applied to rotatable braking member 34 attached to wheel 36 tending to turn wheel 36 counterclockwise, a reaction acts on system 20 (specifically torque actuator 24), and with the effects of inertia tends to pull torque actuator 24 forward. Accordingly, torsion arms 70a and 70b rotate clockwise about pivot points 76a and 76d, respectively, moving overlapping portions 78a and 78b toward each other. Such movement of overlapping portions 78a and 78b decreases the volume of transducer element 74, thereby generating a voltage proportional to the decrease in volume of transducer element 74. Positioning torsion arms 70a, 70b so that they are generally perpendicular to the rotation axis of wheel 36 increases the efficiency and range of sensation of torque feedback transducer 28. The generated voltage drives a signal representing the braking torque applied to wheel 36. The signal is passed through conduit 32 to controller 30 for processing. A positive acceleration would affect torsion arms 70a, 70b oppositely, thereby allowing the volume of transducer element 74 to increase.

Referring to FIG. 4, wheel speed sensor 26 detects the rotational speed of wheel 33. Wheel speed sensor 26 converts the detected wheel rotational speed to an electrical or fiber optic output signal. Wheel speed sensor 26 may be a magnetic pickup positioned adjacent rotatable brake element 34, having periodic ferromagnetic protrusions, a Hall effect sensor, or any convenient speed sensor known in the art. Wheel speed sensor 26 has sufficient resolution to allow controller 30 to use data transmitted therefrom to maximize the braking control efficiency of brake system 20.

Figure 5A:
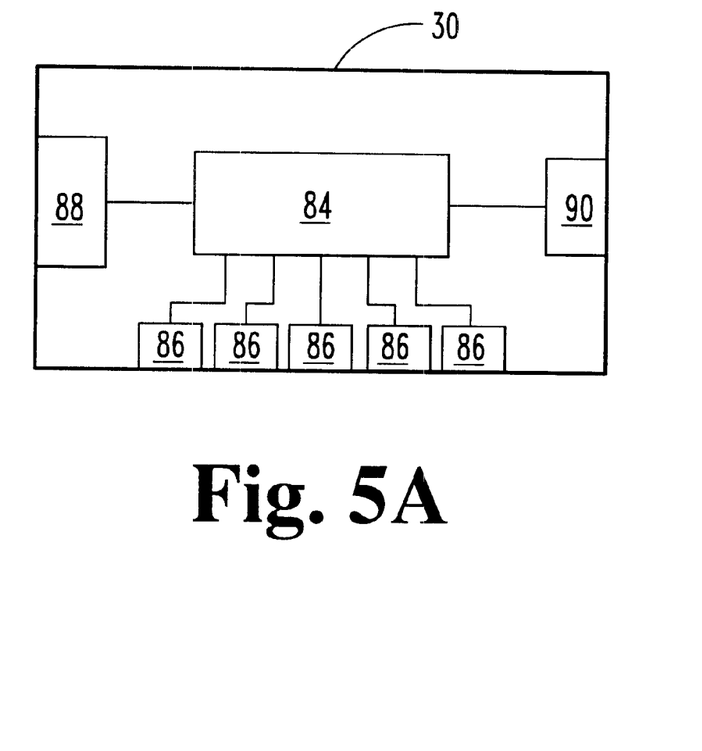
FIG. 5A is a diagrammatic view of an embodiment of the controller of the embodiment of the invention illustrated in FIG. 1.
Figure 5B:
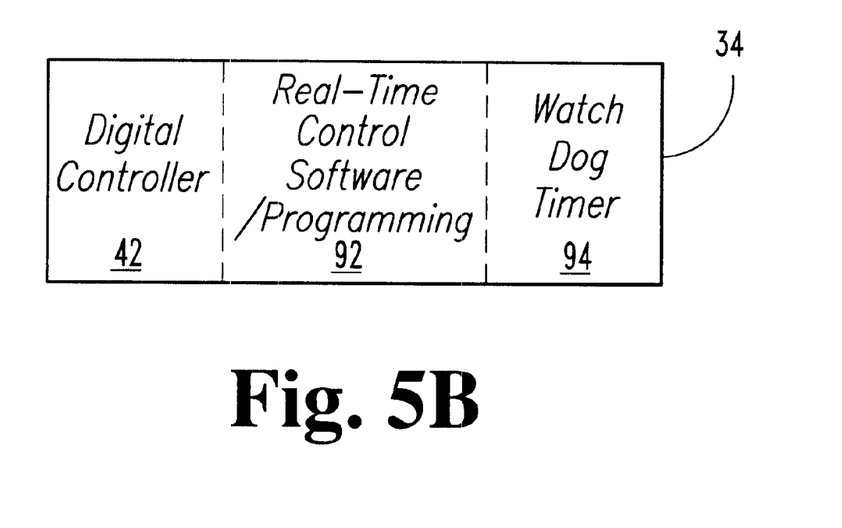
FIG. 5B is a diagrammatic view of an embodiment of a microprocessor for use with the embodiment of the controller illustrated in FIG. 5A.

Referring the embodiment depicted in FIGS. 5a and 5b, controller 30 of the present invention includes a microprocessor 84, built-in test circuits 86, power supply 88, and input/output control 90. Microprocessor 84 may be a digital controller 42 or other appropriate controller. In one form, digital controller 42 is a real time embedded processor with A to D circuitry 92 incorporated, although in other embodiments any convenient microprocessor having sufficient speed and memory may be selected. The control logic and built in test logic are embedded in PROM. The control logic is tuned for each application. The controller circuitry incorporates a series of "watch-dog" timer circuits 94 to provide fail-safe operation in the case of an emergency loss of the electronic controller. Watch dog timer circuits 94 are well known in the art, and are used to activate fail-safe protocols in the event of controller failure. Here, watchdog circuits 94 comprise count down timers that are reinitialized every time controller 30 cycles. The preset count down is longer than any of the cyclic functions of controller 30. Therefore, it is presumed that if watchdog circuit has completed its countdown, controller 30 has malfunctioned or otherwise failed. In this event, watch dog circuit 94 automatically activates a fail-safe protocol, for example, but not limited to, establishing a direct circuit connection between OCIT 22 and torque actuator 24, thus enabling OCIT 22 to operate as if it were a direct mechanical linkage to the brakes. Alternatively, other convenient fail-safe protocols may be opted either as alternatives to, or in combination with, the protocol detailed above.

Figure 9:
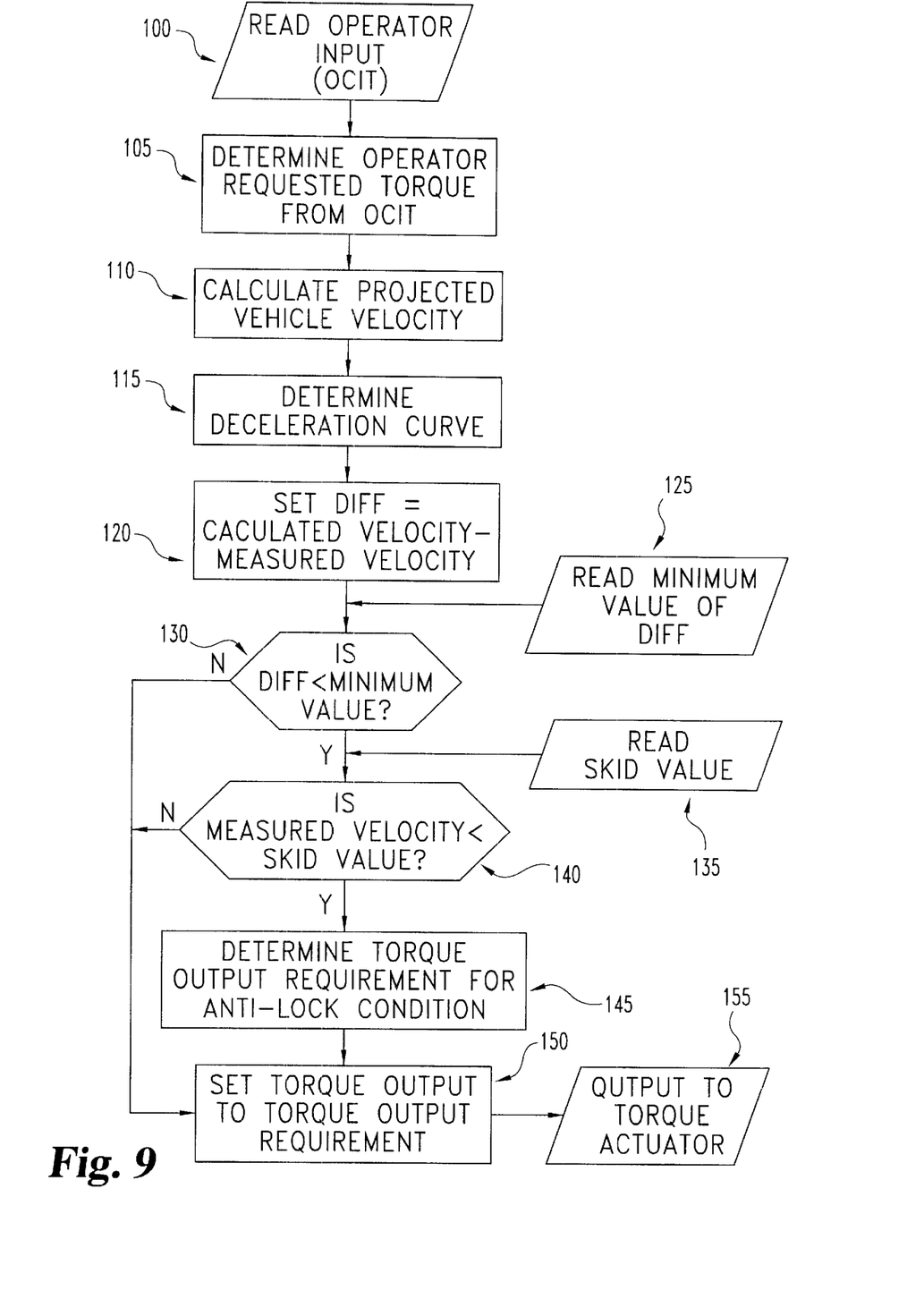
FIG. 9 is a flow chart illustrating one embodiment of a logical process useful in the controller in the embodiment of the present invention illustrated in FIG. 1.

Referring now to FIG. 9, control logic is embedded in hardware and/or software within controller 30 to implement control laws which providing brake torque via electronic signals to individual wheel torque actuators 24 in proportion to an operator input request for a given level of deceleration. FIG. 9 illustrates logic showing that the operator request for braking is input at the brake pedal (step 100) via OCIT 22, which changes physical motion (i.e. pedal deflection) to an electrical signal proportional to the deflection of the pedal. Step 105 illustrates use of a set of deterministic linear equations to relate deflection of pedal to level of requested deceleration rate. The deceleration rate requested is directly related to the required torque to be applied by the brake actuator. One problem that must be accounted for in addition to whether a given wheel has started skidding because the wheel speed has gone to zero is to determine if the vehicle is "stopped" and the operator request must be accepted without assuming a skid. To account for this, the logic needs the vehicle velocity, which is calculated as the average instantaneous speed of the wheels throwing out the value for the highest and lowest speeds (step 110). Alternately, controller 30 can also receive a periodic input of vehicle velocity from a known speedometer device (not shown). In the case of extreme loss of road-wheel friction, for example happening upon ice so that all wheels instantaneously lose velocity, the assumed vehicle velocity is a function of a number "n" of past measurements with forward integration to project the expected speed at the current instant of time. The past history deceleration curve (step 115) is used to determine the rate of change for the projection calculation. The difference between expected or calculated velocity and the wheel speed input (measured velocity) is calculated (step 120) and is used to determine if it is necessary to check for anti-skid condition.

A minimum value of that difference is then read from memory (step 125). If that difference is less than the minimum value (step 130), then a skid is near on the measured wheel. In that case, a skid value is read from memory (step 135). The skid value is a tunable parameter, and is typically small. If the measured velocity is less than the skid value (step 140), then a torque output requirement is determined for the anti-lock braking condition (step 145). The torque output requirement is determined for that wheel to provide the operator requested deceleration within the limits of the available friction between the tire and the road surface. The torque output is then set to the torque output requirement (step 150). If steps 130 or 140 provide a negative result (i.e. the difference between calculated or expected velocity and measured velocity is greater than its minimum value, or the measured velocity is greater than the skid value), indicating that a skid condition is not present or the vehicle velocity is below the limit of concern for a skid condition, then step 150 determines a torque output requirement without regard for anti-lock conditions. Controller 30 sends an output signal to the torque actuator assembly 24 (step 155) corresponding to the torque output requirement.

Accordingly, controller 30 continuously receives inputs from sensors 26 and torque feedback transducer 28 in order to monitor the applied torque and the rate of deceleration of each individual wheel 36 to detect potential skids. The system is adapted to treat an unrealistically rapid drop in wheel 36 speed (difference between calculated velocity and measured velocity exceeds a predetermined threshold value) as a potentially uncontrolled skid. When a skid event is detected, controller 30 invokes the anti-lock mode. In the anti-lock mode (as described in detail below), controller 30 calculates the maximum braking torque that can be applied thereto without stopping the forward rotation of wheel 36. Controller 30 sends a signal to torque actuator 24 to maintain the calculated optimum anti-lock torque level applied to each individual wheel 36 to obtain maximum uniform deceleration within the limits of the current measured and calculated parameters relating to road conditions.

In the anti-lock mode, controller 30 uses the received and/or stored data from wheel speed sensor(s) 26 and torque feedback transducer(s) 28 to construct a curve of the calculated effective coefficient of friction at the road interface versus the slip between the decelerating wheel(s) 36 and the road surface. It is well known that the optimum braking force between a wheel 36 and a road surface (braking in the shortest time) is achieved when the slip is maintained at about 10% to 20%. Controller 30 uses the measured wheel speed and torque values to calculate the effective friction at the interface between the wheel 36 and the road and to calculate the effective slip of wheel 36. Controller 30 constructs a continuously updated friction/slip curve for each controlled wheel 36, with the curve being developed through a set of control laws applicable to the given application, i.e. braking. An example of one possible set of control laws is given below.

As noted above, controller 30 is operationally connected (electrically, fiber-optically or by other conduit) to OCIT 22, and to a wheel speed sensor 26 and a torque feedback transducer 28 for each controlled wheel 26, and receives inputs therefrom. The input commands from OCIT 22 relate to a desired level of output of torque actuator 24. As shown in FIG. 1, OCIT 22 has the form of a foot pedal, although other convenient forms such as a hand lever may be chosen. Controller 30 is adapted to provide OCIT 22 with feedback appropriate to emulate the feedback of a standard hydraulic foot pedal. In one form, a feedback circuit (not shown) is adapted to provide feedback to an electronic transducer (not shown) adapted to supply a resistive mechanical force to OCIT 22 foot pedal simulating road feedback felt in a hydraulic foot pedal. Alternately, feedback may be supplied to OCIT 22 independently of controller 30 by a spring (not shown) adapted to provide resistance to depression thereof. In other forms, any convenient feedback mechanism known in the art may be chosen. The remaining two inputs to controller 30 are independently received from torque feedback transducer 28 and wheel speed sensor/transducer 26 associated with the given wheel 36.

Controller 30 may be programmed with any convenient set of control laws and/or algorithms to effectuate the control of the braking actuator 24 based on known physical constants, predetermined system parameters, and inputs from OCIT 22, torque feedback transducer 28, and wheel speed sensor 26. The underlying mathematics for one such set of control laws is described below. In this approach, controller 30 constructs and continually updates a curve of the calculated effective coefficient of friction at the road interface, $\mu$, versus the slip (in terms of slip velocity, S, further defined below) between the decelerating wheel 36 and the road surface, or "$\mu$-slip curve." A typical •-slip curve is illustrated in U.S. Pat. No. 5,067,778, which patent is incorporated by reference herein, and FIG. 1 of which patent is reprinted herein as FIG. 6. Stable braking occurs when the variables $\mu$ and S describe a point on the up-slope of the curve, e.g. points A and A' of FIG. 6. Optimal braking conditions occur at or near the top of the curve, e.g. point C of FIG. 6. Points along the down-slope of the curve, e.g. point B in FIG. 6, identify a slip condition such as a skid, as when a wheel is locked and slides along a road surface.

Figure 7:
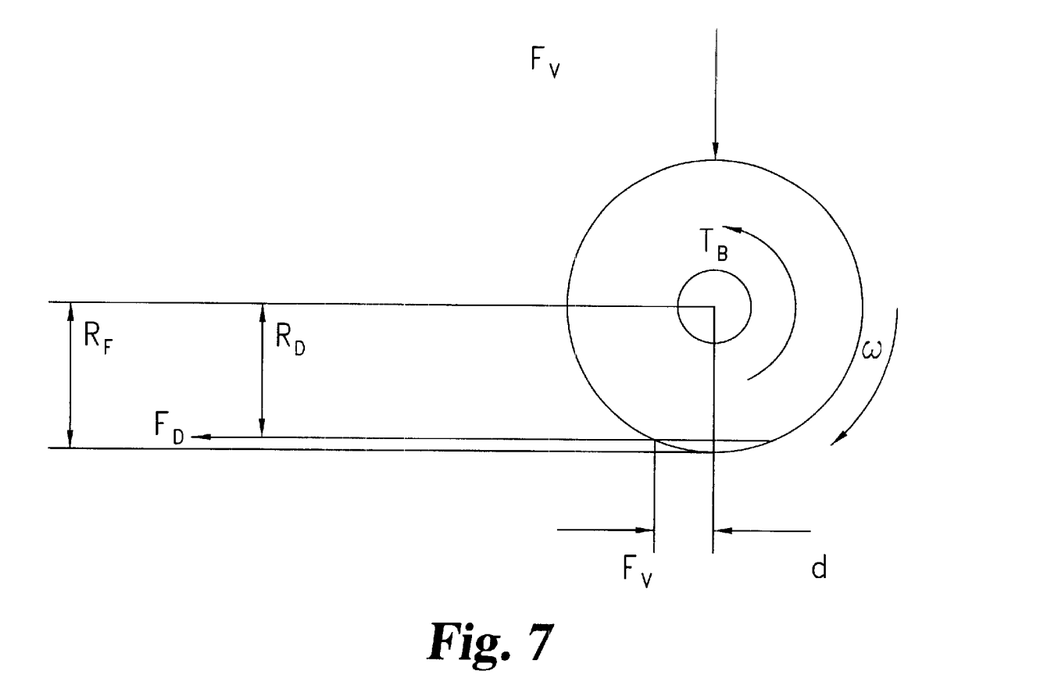
FIG. 7 is an illustrative schematic diagram of the forces acting on a vehicle wheel.
Figure 8:
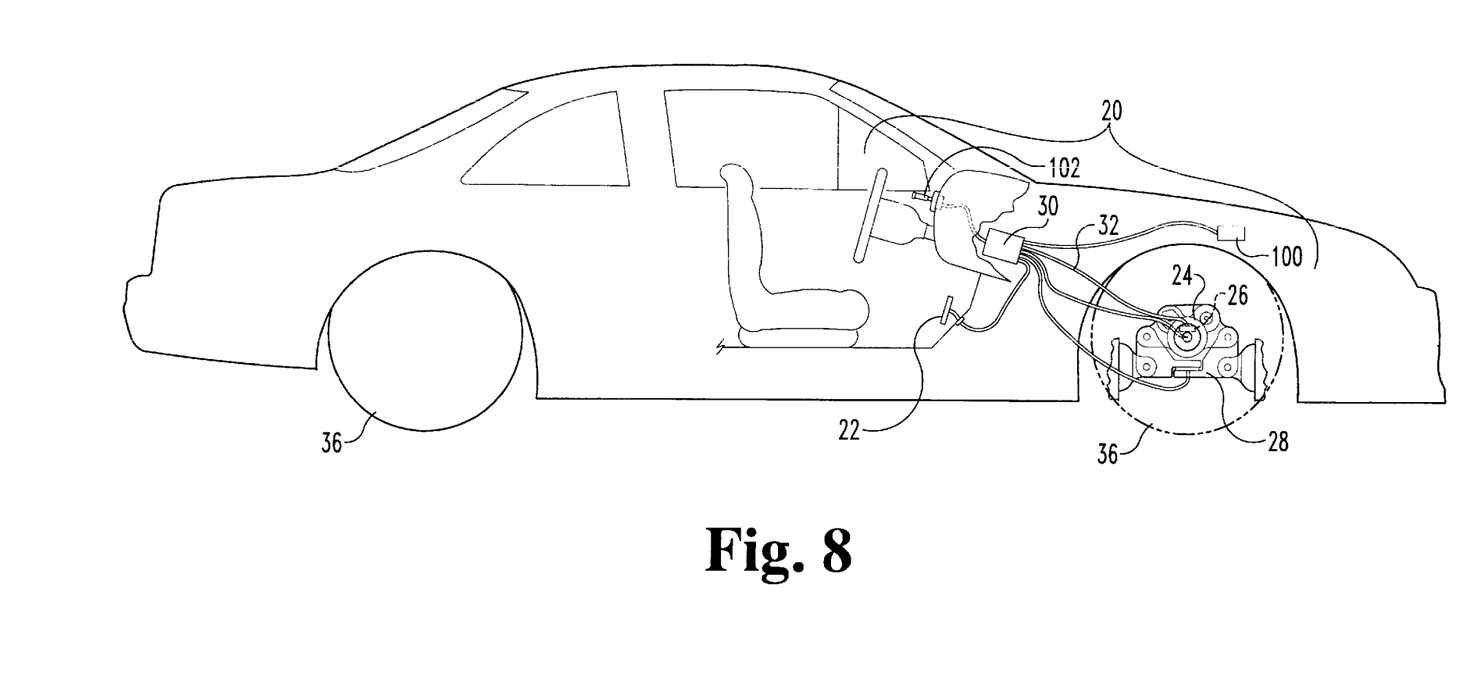
FIG. 8 is a schematic view of a second embodiment of the present invention.

Controlled braking is accomplished through controller 30 monitoring its inputs, determining the optimum level of braking, and sending signals to torque actuator(s) 24 for each controlled wheel 36 representing that level of braking. The braking function will be described in terms of a single wheel 36, although the function is applicable to all wheels on a given vehicle having the braking system of the present invention. Controller 30 continuously receives a signal representing the wheel's angular velocity (•) from wheel speed sensor 26 and a signal representing the torque ($T_B$) produced by a given braking event from torque feedback transducer 28. The vehicle's speed ($V_{ref}$), as noted above, is obtained by averaging speeds obtained from wheel speed sensors on multiple wheels, along with appropriate error discrimination logic, or by an independent speedometer input to controller 30. The following quantities are tunable constants or system parameters (see FIG. 7):

$F_V$=Wheel vertical load $R_F$=Unloaded Tire Radius, i.e. Free Tire Radius $R_D$=Deflected Tire Radius I=Wheel and Tire moment of inertia with respect to the wheel axle K=Tire spring constant These quantities can be preprogrammed into controller 30, or can be input and/or updated by appropriate measuring devices or sensors (not shown), or can be calculated by controller 30 from other preprogrammed or inputted quantities. The slip velocity is defined as $S=V_{ref}-•R_F$, and thus an S data point is calculable for every input of •. The magnitude of $\mu$ is given by $F_D/F_V$, when $F_D$ represents the drag force or force of friction on the wheel, and is divided by the vehicle load or normal force on the wheel. Thus, to determine $\mu$ in the present embodiment, $F_D$ is calculated.

First, the torque on the wheel is given by $$T_B=(F_D*R_D)+(F_V*d)-(I*•') \tag{1}$$

where •' is the angular acceleration of the wheel (d•/dt) and d is a quantity called the "tire footprint center of pressure shift," and is given by $d=F_D/K$. Substituting for d in (1) and solving for $F_D$ gives $$F_D=(T_B+I(d•/dt))/(R_D+F_V/K) \tag{2}$$

If $\mu_R$ is the rolling resistance friction coefficient and $\mu_D$ is the drag or sliding force friction coefficient, then generally $\mu_D>\mu_R$, and since $R_F$ and $R_D$ are related by the tire spring constant K according to $R_F=R_D+F_V/K$, then to take into account rolling friction an approximation for (2) would be:

$$F_D•[T_B+I*•']/[(1-\mu_R/\mu_D)*R_F] \tag{3}$$

A typical value of $\mu_R/\mu_D$ near the skid point C (see FIG. 7) might be 0.05, so for a braking effort near point C, $$[(1-\mu_R/\mu_D)*R_F]•0.95R_F \tag{4}$$

Incorporating (4) into (3) gives $$F_D=[T_B+I(d•/dt)]/0.95R_F \tag{5}$$

As noted above, $\mu=F_D/F_V$, and substituting (5) in that equation gives $$\mu=[T_B+I*•']/[0.95R_F*F_V] \tag{6}$$

Since $$S=V_{ref}-•R_F, \text{ then } •=[V_{ref}-S]/R_F,$$

and $$•'=(1/R_F)*[(dV_{ref}/dt)-(dS/dt)] \tag{7}$$

Substituting (7) into (6) then gives $$\mu=[1/0.95*R_F*F_V]*[T_B+(I/R_F)*(dV_{ref}/dt-dS/dt]$$

$$\mu = [1/0.95*R_F^2*F_V]*[T_B*R_F+I*(dV_{ref}/dt-dS/dt)] \tag{8}$$

$$= k*[T_B*R_F+I*(dV_{ref}/dt-dS/dt)]$$

where $k=1/[0.95*R_F^2*F_V]$. The slope of the $\mu$-slip curve $d\mu/dS=(d\mu/dt)/(dS/dt)$, and therefore $$d\mu/dS=k*\{R_F*(d•/dt)+I*[(d^2V_{ref}/dt^2)-(d^2S/dt^2)]\}*[1/(dS/dt)] \tag{9}$$

Of course, for small increments of time where •t<<1, $$d\mu/dS=\Delta\mu\Delta S=[\mu_i-\mu_{i-1}]/[S_i-S_{i-1}] \tag{10}$$

By definition, • cannot be less than zero, and therefore slip velocity is less than the vehicle velocity, i.e. $0<S/V_{ref}<1$. Using control laws based on the equations presented above, controller 30 calculates S, $\mu$, and $d\mu/dS$ (the slope of the $\mu$-slip curve).

When controller 30 receives input from OCIT 22, indicating a level of braking desired by the vehicle operator, it determines and sends a signal to torque actuator 24. The current signal $C_{vi}$ sent by controller 30 to activate actuator 24 is determined as follows. If a given value of slip velocity at time i ($S_i$) is equal to the vehicle speed at that instant ($V_{ref}$ i), then the vehicle is skidding, i.e. •=0. In that case, $C_{vi}=0$, so that actuator 24 is not caused to operate, and if it is operating, actuator 24 releases the pressure on the brake. If $S_i=0$, then there is no slippage of the wheel at all, and $C_{vi}=1$, i.e. the entire braking signal is sent to the actuator to induce braking. If $0•S_i/V_{ref}<1$, then there is some amount of slippage, and $C_{vi}=j*[(\mu_1-\mu_{i-1})/(S_1-S_{i-1})]^{-1}$, where j is a tunable value preferably representing the relative amount of braking force requested by the vehicle operator via OCIT 22. Further, if $S_i=S_{i-1}$, and therefore $\mu_i=\mu_{i-1}$, then $C_{vi}=C_{vi-1}$, indicating that no change in braking force is necessary.

In operation, wheel speed sensor(s) 26 input values of • into controller 30. As noted above, $V_{ref}$ can be obtained from average wheel speed of several wheels 36, or can be input into controller 30 from a separate speedometer apparatus. Controller 30 makes calculations, including those identified above, and in that embodiment updates the values of S and $\mu$ and $dS/d\mu$, which identify the $\mu$-slip curve that describes the frictional conditions. When braking is desired, at a time t=0, OCIT 22 is actuated (e.g. by depressing a foot pedal). The extent of actuation of OCIT 22, such as the distance or speed of depression, creates a signal indicating the relative amount of braking force desired, which signal is sent to controller 30. Based on the then-current values of S, $V_{ref}$, $\mu$, $dS/d\mu$ and/or $T_B$, controller 30 calculates the factor $C_v$ that determines the magnitude of the current signal to be sent to the torque actuator 24 brake of a given wheel 36. That signal is sent to actuator 24 along electrical, fiber-optic or other conduit 32, and actuator 24 operates as described above to exert braking torque on the given wheel 36. A reactive torque is exerted on torsion arms 70a and 70b of torque feedback transducer 28 as described above, which then exert pressure on transducer element 74 of torque feedback transducer 28. Transducer element 74 sends a signal, as described above, to controller 30. That signal represents the reactive torque, which is equal to the braking torque ($T_B$) experienced by the wheel. The received value of $T_B$ is used by controller 30 along with inputs from the other sensors to update the calculation of S, $\mu$ and $dS/d\mu$.

If the values of S, $V_{ref}$, $\mu$ and $dS/d\mu$ calculated by controller 30 indicate optimum braking, i.e. $dS/d\mu$ approaches 0, then controller 30 need only make adjustments to the amount of braking in response to changes in the values reported by the sensors. If, however, those values do not indicate optimum braking, then controller 30 can further alter the current signal sent to torque actuators 24. If $dS/d\mu<0$, indicating a skid condition (see point B of FIG. 7), then the anti-lock capability described above is invoked. If $dS/d\mu>0$, indicating less than optimum braking (see points A and A' of FIG. 7), then controller 30 increases the braking signal until $dS/d\mu$ approaches 0 to within an acceptable approximation.

Controller 30, in a preferred embodiment, receives and reads data from sensor(s) 26, torque feedback transducer 28, OCIT 22 and any other inputs, makes the appropriate calculations, and adjusts the braking signal sent to wheel(s) 36 (if necessary) approximately 20–50 times per second. Using different forms of hardware and/or software as controller 30, or in applications other than vehicle braking, an increase or decrease in the frequency of reading, calculating and adjusting may be obtained. Controller 30 maintains a set of received and calculated data such as •, S, $\mu$, $T_B$ and $dS/d\mu$ for each controlled wheel 36 in memory.

Controller 30 thus continuously maintains the braking torque on the wheel at the maximum desired level within the limits allowed by the coefficient of friction at the tire/surface interface. The controller 30 may thus control the braking of a single vehicle wheel 36, or the braking of a plurality of vehicle wheels 36. Deceleration requests that exceed the limits of steady braking determined by the instantaneously calculated friction conditions at the tire/roadway interface will initiate the anti-lock algorithm of the electronic control system within the electronics, thereby allowing brake torque to be applied in a manner to retard or stop the vehicle's wheel rotation without loss of vehicular control.

During braking, controller 30 adjusts the torque output commands to the torque actuator 28 for each controlled wheel 36 to maintain maximum braking at the optimal level. Additionally, controller 30 coordinates the braking torque commands to all of the controlled wheels 36 to maintain uniform braking of the vehicle and optimize operator control. Controller 30 therefore both individually optimizes the braking torque applied to each wheel 36 and also optimizes the braking torque applied to all of the wheels 36 of the vehicle as a system.

Controller 30 incorporates built-in testing to continuously analyze the system for system failures that require implementing fail-safe brake operation. When a fault in brake system 20 is detected, e.g. continual ineffective braking torque as gauged by torque feedback transducer 28 or a loss of connection to one or more sensors, a record of the fault and accompanying data is maintained in the memory of digital controller 42 for later downloading and/or analysis. Selected performance and fault data will be available for display to the maintenance operator.

All components including digital controller 42 and controller 30 may be duplicated to provide required levels of redundancy for specific applications and/or reliability constraints.

In addition to traditional OCIT-actuated brake commands, in an alternate embodiment controller 30 is adapted to receive signals from the vehicle engine or from a sensor (not shown) operatively connected to the engine, which signals indicate the operating status of the engine (e.g. on or off). When controller 30 receives a signal indicating that the engine is not operating, controller 30 can send a command to torque actuator 24 to apply a predetermined level of braking force. Conversely, when controller 30 receives a signal indicating that the engine is operating, controller 30 can discontinue the command to torque actuator 24 to apply a predetermined level of braking force, thereby releasing the wheels for operation. Similarly, a switch or sensor (not shown) can send a signal to controller 30 when the vehicle gearshift is placed in park, on reception of which controller 30 can send a command to torque actuator 24 to apply a predetermined level of braking force. In yet another embodiment, controller 30 is adapted to receive a braking command from any other convenient electrical or fiber optic signal sent by a remote sensor positioned within the vehicle. In this way, for example, emergency braking can be activated by various conditions sensed inside or outside of the vehicle.

Figure 6:
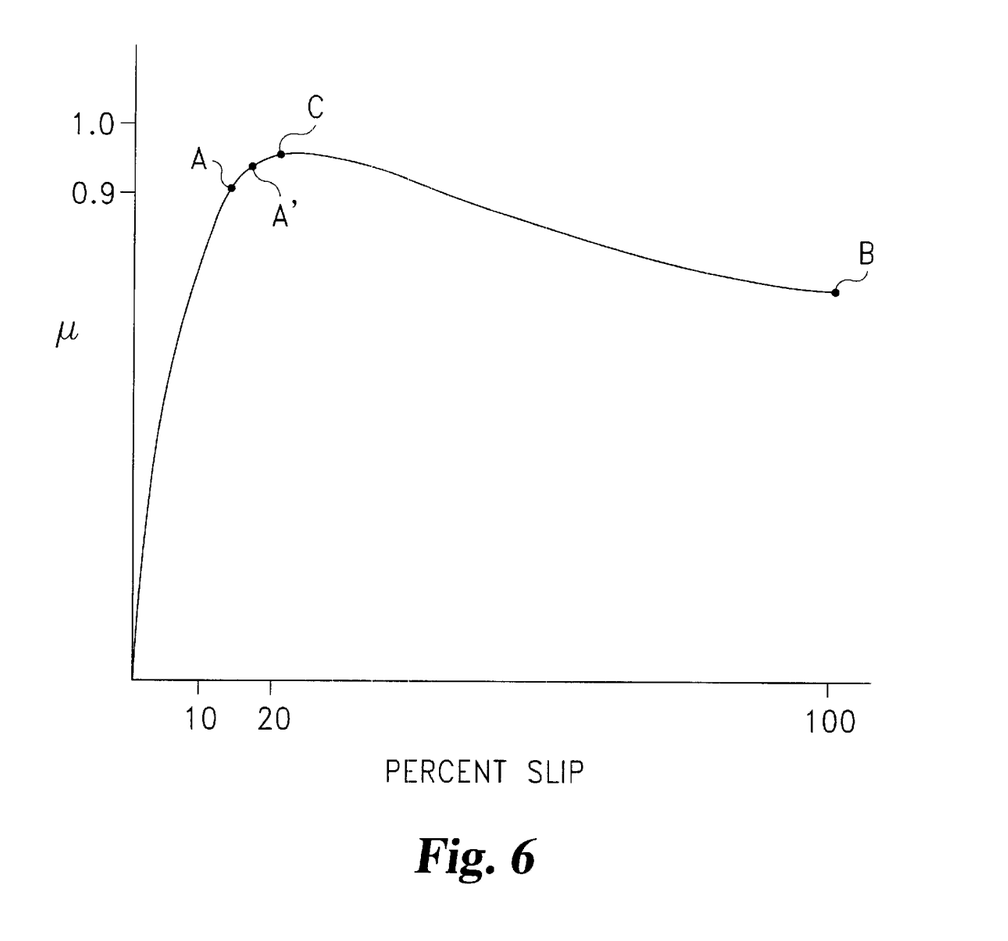
FIG. 6 is an illustrative graph of a typical •-slip curve.

Referring to FIG. 6, braking system 20 may also be adapted to send a maximum braking command to the torque actuator 24 when a predetermined condition is met, such as in the event of engine failure/deactivation or failure of digital controller 42. An engine status sensor 100 may be adapted to send a first signal to controller 30 when the engine is running, and controller 30 may be programmed to send a braking command to torque actuator 24 in the absence of a the first signal from the engine status sensor 100. The system 20 may be further adapted to function with an independent input unit 102, such as a parking brake control or hand brake control. The operator may use parking brake 102 to send a first signal to controller 30. For the duration of the signal (while parking brake 102 is on) controller 30 applies a predetermined level of braking torque to the controlled wheel or wheels 36. Controller 30 reduces the applied braking torque to a nominal level when parking brake 102 is let off. Also, the system may be adapted to send a feedback signal to OCIT 22 to simulate the feel of a standard hydraulic brake control.

The present invention has been described in the form of a brake system embodiment. Other forms of the present invention are contemplated, including but not limited to a power steering system, a vibrational damping system, and other systems wherein constant monitoring and adjustment of pressure and/or torque is desired.

While the invention has been illustrated and described in detail in the drawings and foregoing description, the same is to be considered as illustrative and not restrictive in character, it being understood that only one preferred embodiment has been shown and described and that all changes and modifications that come within the spirit of the invention are desired to be protected.

What is claimed is:

1. A brake system for a vehicle, comprising:
   an operator input transducer providing a first signal corresponding to a braking demand;

a rotatable vehicle member capable of having a rotation speed and an applied torque;

a torque feedback transducer assembly coupled to said rotatable vehicle member for measuring the torque and providing a second signal corresponding thereto;

a wheel speed sensor for providing a third signal corresponding to the rotation speed;

a controller for receiving signals including said first signal, said second signal, and said third signal and providing signals including a fourth signal, said fourth signal corresponding to an applied braking torque; and a torque actuator assembly adapted to provide a directly applied braking torque to said rotatable vehicle member in response to receiving said fourth signal from said controller;

wherein the torque actuator assembly is hydraulically independent from a master cylinder.

2. The system of claim 1, further including:

a second rotatable vehicle member;

a second torque feedback transducer assembly, said second torque feedback transducer assembly being associated with said second rotatable vehicle member and adapted to send a fifth signal to the controller;

a second wheel speed sensor, said second wheel speed sensor being associated with said second rotatable vehicle member and adapted to send a sixth signal to the controller; and a second torque actuator assembly, said second torque actuator assembly being associated with said second rotatable vehicle member and adapted to supply an electrically distributed braking force to said associated rotatable vehicle member in response to receiving from said controller a seventh signal.

3. The system of claim 1 wherein the torque actuator comprises:

a hydraulic wheel cylinder having a unidirectional valve in fluid communication with said wheel cylinder;

a piston mounted at least partially within said wheel cylinder;

a piezoelectric element positioned within the hydraulic wheel cylinder and operationally coupled to said controller;

a rotatable brake element associated with said rotatable vehicle member; and, a non-rotatable brake element operationally connected to the piston and positioned between said rotatable brake element and said hydraulic wheel cylinder piston.

4. The system of claim 3 wherein the rotating vehicle member is a wheel, the non-rotatable brake element is a brake pad, and the rotatable brake element is a wheel rotor.

5. The system of claim 3 wherein the torque actuator further comprises a fluid reservoir in fluid communication with the unidirectional valve.

6. The system of claim 3 wherein the piezoelectric element comprises a flexible laminate of pre-stressed polymeric materials and piezoelectric ceramic.

7. The system of claim 1 wherein the torque feedback transducer comprises:

a pair of overlapping torsion arms pivotably coupled to opposite sides of the torque actuator assembly and extending toward each other; and a piezoelectric transducer element positioned between said torsion arms and operationally coupled to said controller;

wherein the plane of pivoting of said torsion arms is substantially perpendicular to the axis of rotation of the rotatable vehicle member.

8. The system of claim 7 wherein the transducer element is a flexible laminate of pre-stressed polymeric materials and piezoelectric ceramic.

9. The system of claim 1 wherein the controller comprises:

a digital controller;

at least one test circuit;

a power supply; and an input/output interface.

10. The system of claim 9, wherein the digital controller is a real time embedded processor including an analog to digital converter, and control logic and test logic embedded in PROM.

11. The system of claim 10 wherein the digital controller further comprises at least one watchdog timer circuit adapted to coordinate fail-safe operation in the case of loss of operation of the controller.

12. The system of claim 10, further comprising:

a plurality of rotatable vehicle members;

a plurality of wheel speed sensors each individually associated with a separate rotatable vehicle member and operationally connected to the controller; and a plurality of torque actuator assemblies each individually associated with a separate rotatable vehicle member and operationally connected to the controller, wherein the controller is adapted to individually control the plurality of torque actuator assemblies to provide brake torque to the plurality of rotatable vehicle members.

13. The system of claim 12, wherein the operator command input transducer, the wheel speed sensors, and the torque feedback transducers are adapted to provide input signals to the controller and wherein the controller is adapted to processing the input signals, to calculate a brake torque for each rotatable vehicle member, and to send commands to the torque actuator assemblies to individually brake the respective rotatable vehicle members.

14. The system of claim 9 further comprising an engine operation sensor operationally coupled to the vehicle and adapted to send a first signal to the controller when the vehicle is operating and a second signal to the controller when the vehicle is not operating.

15. The system of claim 14, wherein said controller applies a predetermined level of braking torque to the rotatable vehicle member when the first signal of the engine operation sensor is received, and removes the predetermined level of braking torque from the rotatable vehicle member when the second signal from the engine operation sensor is received.

16. A torque feedback transducer system comprising:

a frame;

a first torsion arm pivotably coupled at a first point of said first torsion arm to a first portion of the frame;

a second torsion arm pivotably coupled at a first point of said second torsion arm to a second portion of the frame;

said torsion arms including overlapping portions;

a piezoelectric transducer element having a volume and positioned between said overlapping portions of said torsion arms and adapted to be operationally connected to a controller;

wherein said torsion arms pivot around their respective first points when a force is exerted on said frame, thereby changing the volume of said transducer element.

17. The system of claim 16, further comprising a linking member pivotably connected to said first torsion arm at a second point of said first torsion arm and pivotably connected to said second torsion arm at a second point of said second torsion arm.

18. The system of claim 17, wherein said linking member comprises a vehicle braking torque actuator.

19. The system of claim 16 wherein the transducer element is a flexible laminate of pre-stressed polymeric materials and piezoelectric ceramic.

20. A brake system for a vehicle, comprising:
   an operator input transducer providing a first signal corresponding to a braking demand;
   a rotatable vehicle member capable of having a rotation speed and an applied torque;
   a torque feedback transducer assembly coupled to said rotatable vehicle member for measuring the torque and providing a second signal corresponding thereto;
   a wheel speed sensor for providing a third signal corresponding to the rotation speed;
   a controller for receiving signals including said first signal, said second signal, and said third signal and providing signals including a fourth signal, said fourth signal corresponding to an applied braking torque; and
   a torque actuator assembly adapted to provide an applied braking torque to said rotatable vehicle member in response to receiving said fourth signal from said controller;
   wherein the torque feedback transducer comprises:
      a pair of overlapping torsion arms pivotably coupled to opposite sides of the torque actuator assembly and extending toward each other; and
      a piezoelectric transducer element having a first volume and positioned between said torsion arms and operationally coupled to said controller;
      wherein said torsion arms pivot when a force is exerted on said frame, thereby changing the volume of said transducer element.

* * * * *